United States Patent
Vlasich et al.

(10) Patent No.: US 12,432,250 B2
(45) Date of Patent: Sep. 30, 2025

(54) DISTRIBUTED INTRUSION DETECTION SYSTEMS (IDS) AND METHODS FOR INTERNET OF THINGS (IoT) DEVICES

(71) Applicant: Honeywell International Inc., Charlotte, NC (US)

(72) Inventors: Kevin Peter Vlasich, Centerville, MN (US); Geoffrey Allen Lowe, Golden Valley, MN (US); Marion Mark Cherry, Golden Valley, MN (US); Kevin P. Staggs, Phoenix, AZ (US)

(73) Assignee: Honeywell International Inc., Charlotte, NC (US)

(*) Notice: Subject to any disclaimer, the term of this patent is extended or adjusted under 35 U.S.C. 154(b) by 199 days.

(21) Appl. No.: 18/356,753

(22) Filed: Jul. 21, 2023

(65) Prior Publication Data

US 2025/0030720 A1   Jan. 23, 2025

(51) Int. Cl.
*H04L 9/00* (2022.01)
*G06F 11/00* (2006.01)
*H04L 9/40* (2022.01)
*H04L 67/12* (2022.01)

(52) U.S. Cl.
CPC ...... *H04L 63/1433* (2013.01); *H04L 63/1425* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 10,230,745 B2 | 3/2019 | Singh et al. | |
| 2003/0188189 A1* | 10/2003 | Desai | H04L 63/104 726/23 |
| 2013/0014263 A1* | 1/2013 | Porcello | H04L 63/0272 726/25 |
| 2017/0142143 A1* | 5/2017 | Seward | G06F 16/212 |
| 2017/0339178 A1* | 11/2017 | Mahaffey | G06F 11/3006 |
| 2019/0158524 A1* | 5/2019 | Zadeh | H04L 61/103 |
| 2019/0222590 A1 | 7/2019 | Mady et al. | |
| 2022/0232025 A1* | 7/2022 | Kapoor | H04L 63/1425 |
| 2023/0091179 A1* | 3/2023 | Bari | H04L 9/3236 713/168 |
| 2023/0208869 A1* | 6/2023 | Bisht | G06N 7/01 726/23 |

OTHER PUBLICATIONS

Extended European Search Report Mailed on Nov. 19, 2024 for EP Application No. 24184664, 9 page(s).
Fabiha Hashmat et al., "An automated context-aware IoT vulnerability assessment rule-set generator," Computer Communications, 186:133-152, (2022).

* cited by examiner

*Primary Examiner* — Christopher B Robinson
(74) *Attorney, Agent, or Firm* — Alston & Bird LLP

(57) ABSTRACT

A distributed intrusion detection system (IDS) is provided. The IDS includes, but is not limited to: a plurality of IDS sensors distributed in internet of things (IoT) devices; and a server, coupled to the plurality of IDS sensors through a network, where the plurality of IDS sensors is configured to collect event data from the IoT devices, and the server is configured to: receive the collected event data from the plurality of IDS sensors; determine if an intrusion event occurs by correlating and analyzing the collected event data; and generate an alert in an instance in which the intrusion event occurs.

14 Claims, 9 Drawing Sheets

DISTRIBUTED INTRUSION DETECTION SYSTEMS (IDS) AND METHODS FOR INTERNET OF THINGS (IoT) DEVICES

FIELD OF THE INVENTION

Exemplary embodiments of the present disclosure relate generally to distributed intrusion detection systems (IDS), and more particularly, in some examples, to distributed intrusion detection systems (IDS) and methods for internet of things (IoT) devices.

BACKGROUND

Applicant has identified many technical challenges and difficulties associated with intrusion detection systems (IDS) for internet of things (IoT) devices. Through applied effort, ingenuity, and innovation, Applicant has solved problems relating to these intrusion detection systems by developing solutions embodied in the present disclosure, which are described in detail below.

BRIEF SUMMARY

Various embodiments described herein relate to components, apparatuses, and systems for monitoring an internal organ temperature.

In accordance with various embodiments of the present disclosure, a distributed intrusion detection system (IDS) is provided. The IDS includes, but not limited to: a plurality of IDS sensors distributed in internet of things (IoT) devices; and a server, coupled to the plurality of IDS sensors through a network, where the plurality of IDS sensors is configured to collect event data from the IoT devices, and the server is configured to: receive the collected event data from the plurality of IDS sensors; determine if an intrusion event occurs by correlating and analyzing the collected event data; and generate an alert in an instance in which the intrusion event occurs.

In some embodiments, the plurality of IDS sensors include at least one inspection engine embedded in corresponding IoT devices, where the at least one inspection engine is configured to monitor system health status of the corresponding IoT devices.

In some embodiments, the plurality of IDS sensors include at least one frame hook embedded in applications of corresponding IoT devices, where the at least one inspection engine is configured to communicate with the at least one frame hook and monitor if the intrusion event occurs to the applications of the corresponding IoT devices.

In some embodiments, the plurality of IDS sensors include at least one reconnaissance engine, where the at least one reconnaissance engine is configured to monitor if the intrusion event occurs to the network.

In some embodiments, the server is further configured to: send the alert to IoT devices that are associated with the collected event data.

In some embodiments, the server includes an intrusion database and the intrusion database is configured to store at least one or more historically intrusion data representing one or more malicious content items.

In some embodiments, correlating and analyzing the collected event data includes comparing the collected event data to the at least one or more historically intrusion data stored in the intrusion database and identifying the intrusion event.

In some embodiments, comparing the collected event data to the at least one or more historically intrusion data stored in the intrusion database includes: comparing a hash value of the collected event data with a hash value of the at least one or more historically intrusion data stored in the intrusion database.

In some embodiments, the server is located on premises of the IoT devices or in a cloud.

In some embodiments, the plurality of IDS sensors use Tshark for network protocol analysis.

According to another embodiment, a method for distributed intrusion detection by a server is provided. The method includes, but not limited to: receiving event data from a plurality of intrusion detection system (IDS) sensors, where the plurality of IDS sensors are distributed in internet of things (IoT) devices and are configured to collect the event data from IoT devices, and the server is coupled to the plurality of IDS sensors through a network; determining if an intrusion event occurs by correlating and analyzing the collected event data; and generating an alert in an instance in which the intrusion event occurs.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
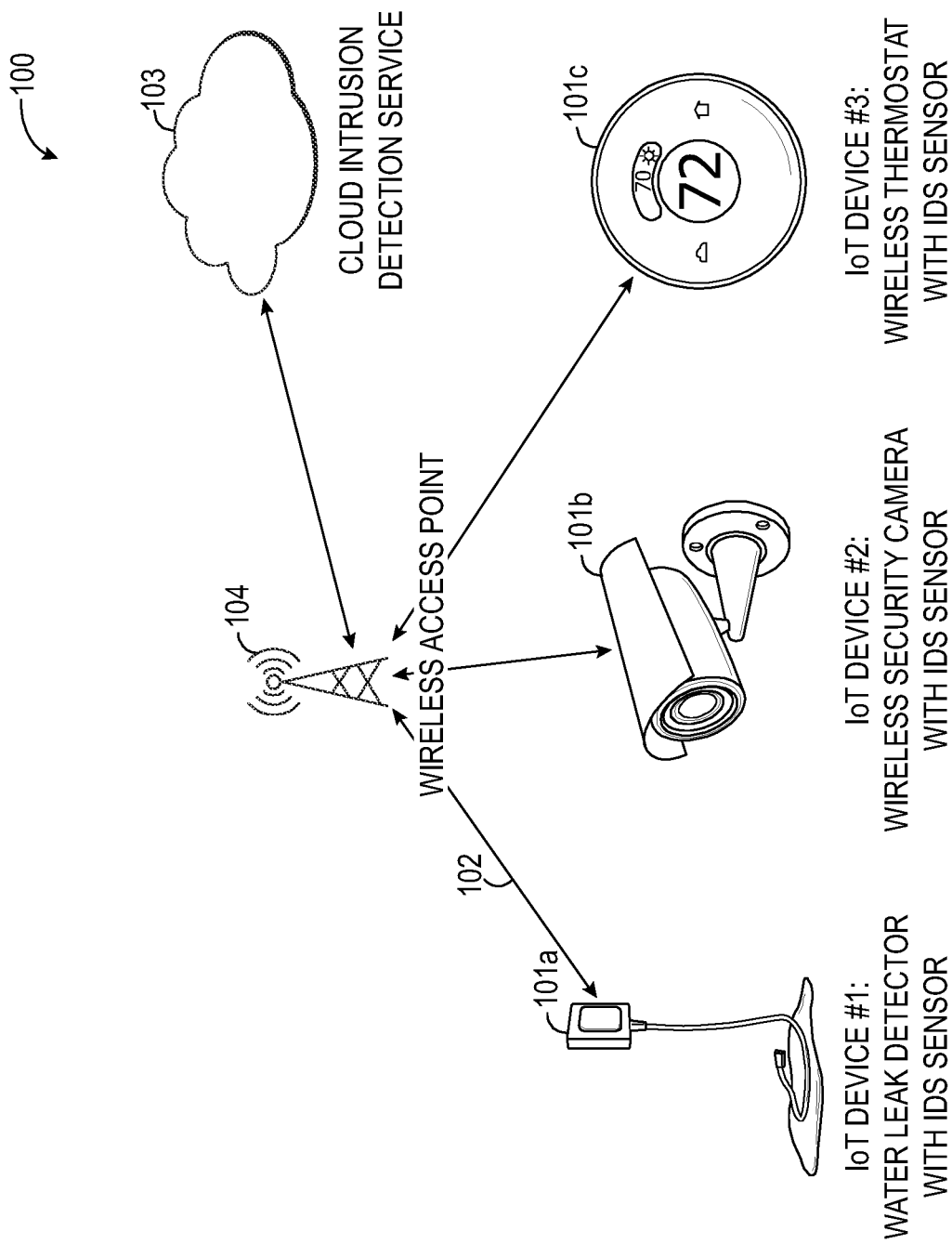
FIG. 1 illustrates an exemplary diagram depicting an example distributed intrusion detection system (IDS), in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as "comprises", "includes", and "having" should be understood to provide support for narrower terms such as "consisting of", "consisting essentially of", and "comprised substantially of".

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "intrusion detection systems" (IDS) is used herein to describe a security technology designed to detect and respond to unauthorized or otherwise malicious activity within a computer network system. The IDS may monitor network traffic, system events, and user behavior to identify and alert on potential security breaches or policy violations. The IDS may analyze network packets/system logs in real-time, look for signs of suspicious/anormal activities, and may compare activity with known patterns of attacks. Alternatively or additionally, the IDS may learn, such as via supervised or unsupervised learning, to detect various suspicious/anormal activities and classify them as unauthorized or otherwise malicious activity.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Various example embodiments address exemplary technical problems associated with intrusion detection systems (IDS) for internet of things (IoT) devices. As understood by those of skill in the field to which the present disclosure pertains, for example, IoT devices are typically lower or low cost devices and are vulnerable to a variety of cyber security related attacks. In some examples, the IoT devices may have limited processing power, memories, storages, and network capabilities. Thus, it is challenging, in some examples, to implement security measures directly on IoT devices. As such, there are numerous technical challenges related to performing network security management with respect to the IoT devices.

To address at least these exemplary problems as well as others, example systems and methods described herein improve, in some examples, the security measures of IoT devices. For example, a distributed intrusion detection system (IDS) may be used for the IoT devices to detect the intrusion. For example, the distributed IDS may comprise a plurality of IDS sensors distributed in internet of things (IoT) devices and a server coupled to the plurality of IDS sensors through a network. In some examples, the plurality of IDS sensors may be configured to collect event data from the IoT devices. In some examples, the server may be configured to receive the collected event data from the plurality of IDS sensors and determine if an intrusion event occurs by correlating and analyzing the collected event data.

As a result of the herein described embodiments and in some examples, the distributed IDS may correlate and analyze the event data collected by the IDS sensors on a server. For example, the accuracy and efficiency of the IDS may be improved, in some examples, without the increase cost and power required by previous existing technologies.

Referring now to FIG. 1, an example diagram illustrating a distributed intrusion detection system (IDS) 100 in accordance with some example embodiments described herein is provided. As shown in FIG. 1, the distributed IDS 100 may comprise internet of things (IoT) devices (e.g., 101a, 101b, and 101c), a network 102, and a server 103. For example, the server 103 may be configured to couple and/or communicate with the IoT devices (e.g., 101a, 101b, and 101c) through the network 102.

In some embodiments, the distributed IDS 100 may be implemented in an IoT platform. The IoT platform may be an extensible platform that is portable for deployment in any cloud or data center environment. In further examples, the IoT platform may be local or otherwise on premises.

In some embodiments, an example IoT device may be a wired device that connects and communicates through a cable with the network 102. In some examples, the wired device may connect and communicate with other IoT devices. In some embodiments, an example IoT device may be a wireless device that connects and communicates wirelessly with the network 102. In some examples, the wireless device may connect and communicate with the other IoT devices.

In some examples, an example IoT device may be a thermostat, configured to monitor or measure a temperature of an ambient environment. In some examples, an example IoT device may be a water leak detector, configured to detect water leaks and/or flooding. For example, the water leak detector may be configured to detect the water leaks and/or the flooding in a home or a building. In some examples, an example IoT device may be a security camera, configured to monitor and/or record activities in a specific area. For example, the security camera may be configured to monitor activities in a home or a building.

In some examples, the IoT devices may be further configured to collect data and transmit the data to the server 103 through the network 102. For example, the server 103 may be configured to analyze the data. In some examples, the server 103 may be located in a cloud. In some examples, the server may be located and/or installed on a computer that is on premises of the IoT devices. In some examples, collecting data from multiple IoT devices increases the effectiveness of correctly identifying the intrusion event.

In some embodiments, the IoT device may communicates with the server through an intermediate device (e.g., a wireless access point 104) that controls data flow between the IoT device and the server 103.

In some embodiments, the network 102 may be any suitable network or combination of networks and supports any appropriate protocol suitable for communication of data to and from components of the cloud and between various other components in the networked computing system environment (e.g., the IoT devices 101a, 101b, and 101c, and the wireless access point 104). According to various embodiments, the network 102 includes a public network (e.g., the Internet), a private network (e.g., a network within an organization), or a combination of public and/or private networks. According to various embodiments, the network 102 may be configured to provide communication between various components depicted in FIG. 1. According to various embodiments, the network 102 comprises one or more networks that connect devices and/or components in the network layout to allow communication between the devices and/or components. For example, in one or more embodiments, the network 102 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network 102 is implemented using cellular networks, satellite, licensed radio, or a combination of cellular, satellite, licensed radio, and/or unlicensed radio networks.

Figure 2:
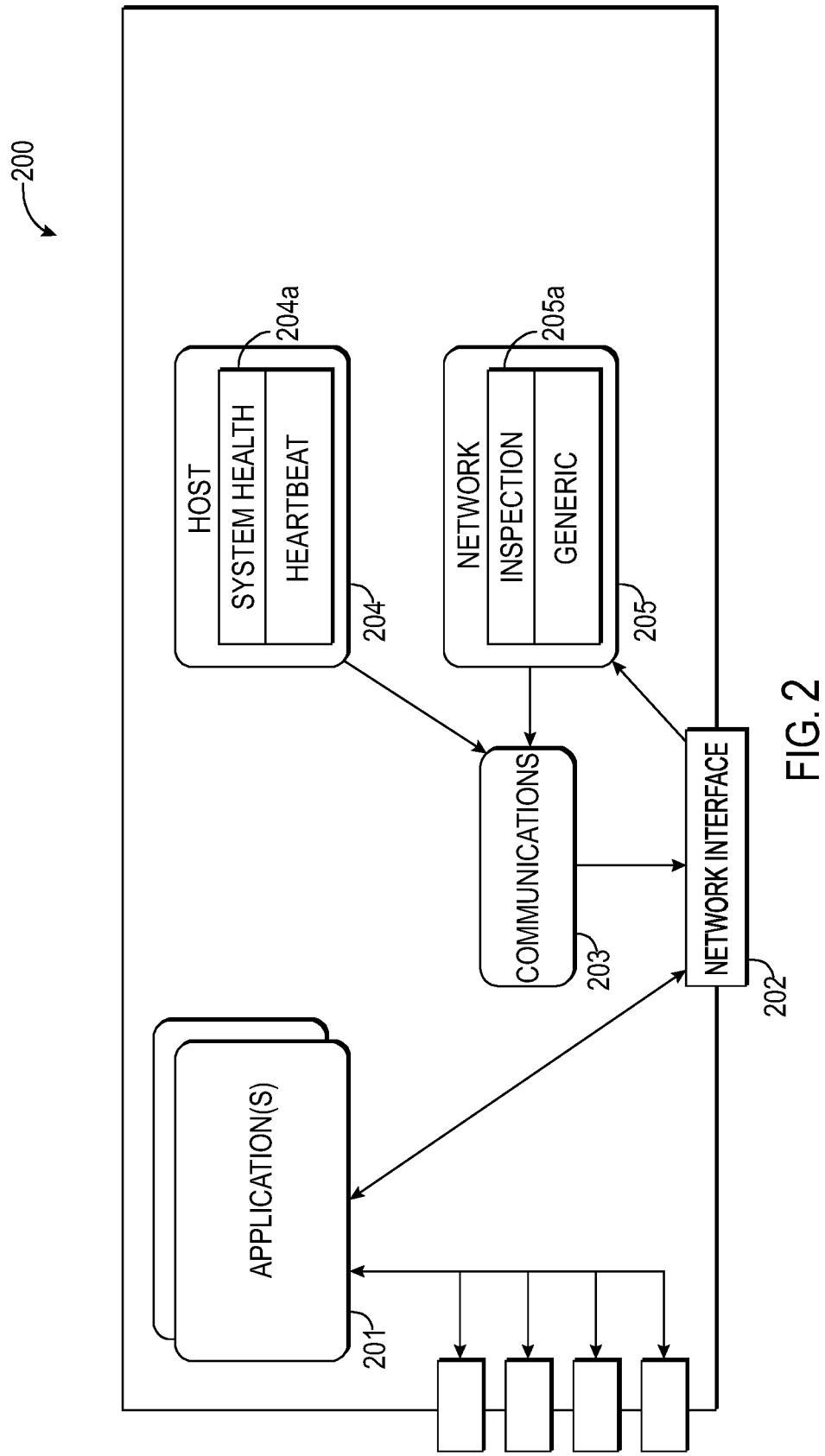
FIG. 2 illustrates an example diagram illustrating a system environment of an example internet of things (IoT) device, in accordance with various embodiments of the present disclosure.

Referring now to FIG. 2, an example diagram illustrating a system environment 200 of an example IoT device (e.g., 101a, 101b, and 101c) in accordance with some example embodiments described herein is provided. As shown in FIG. 2, the system environment 200 may comprise a main application 201, a network interface 202, and a communication module 203. For example, the main application 201 may be configured to couple and/or communicate with the communication module 203 through the network interface 202.

In some embodiments, the system environment 200 may further comprise an IDS sensor that runs on a network 205. In some examples, the IDS sensor may comprise an inspection engine 205a. In some examples, the inspection engine 205a may be configured to receive data through the network interface 202.

In some embodiments, the system environment 200 may further comprise a host 204, configured to communicate with the communication module 203. In some examples, the host 204 may comprise a system monitor 204a that runs on the host 204. In some examples, the system monitor 204a may be configured to monitor the system health of the example IoT device.

For example, the system monitor 204a may collect data (e.g., system health data, such as a heartbeat of the example IoT device) and transmit the collected data to the network interface 202 through the communication module 203. For example, a heartbeat of the example IoT device may indicate a status (e.g., online or offline) of the example IoT device. In some examples, the collected data may be transmitted to the IDS sensor (e.g., the inspection engine 205a) or otherwise accessed by the IDS sensor. In some examples, the IDS sensor (e.g., the inspection engine 205a) may analyze and process the collected data, and generate event data upon detection of abnormality. In some examples, the event data may be transmitted to the network interface 202 through the communication module 203, and further transmitted to the server 103 through the network 102.

In some examples, the inspection engine 205a may utilize signature-based rules (e.g., Snort) and/or anomaly detection methods.

In some examples, the event data generated by the inspection engine 205a may indicate address resolution protocol (ARP) spoofing. TCP SYN/Null packets, teardrop (e.g., overlapping IP fragments), BACnet anomalies, or combinations of any of these. In some examples, the IDS sensor may use a tool, such as Tshark, for network protocol analysis (e.g., to capture packet data from a network, read packets from a previously saved capture file, and/or printing a decoded form of the packets/writing the packets to a file). For example, Tshark may be configured to capture and display network packet data without a graphical user interface (GUI). In some examples, Tshark may comprise built-in dissectors to analyze the network protocol.

In some examples, Tshark may have a native support for extending functionalities using Lua. In some examples, Tshark may set the network interface 202 in a promiscuous mode. For example, the promiscuous mode may allow the example IoT device to intercept and ingest each network packet in the collected data.

In some embodiments, the server 103 may comprise an intrusion database that is configured to store at least one or more historically intrusion data representing one or more malicious content items. In some examples, the server 103 may be configured to correlate and analyze the collected event data. For example, the server 103 may be configured to compare the collected event data to the at least one or more historically intrusion data stored in the intrusion database and identify an intrusion event. In some examples, the server 103 may be configured to compare a hash value of the collected event data with a hash value of the at least one or more historically intrusion data stored in the intrusion database.

Figure 3:
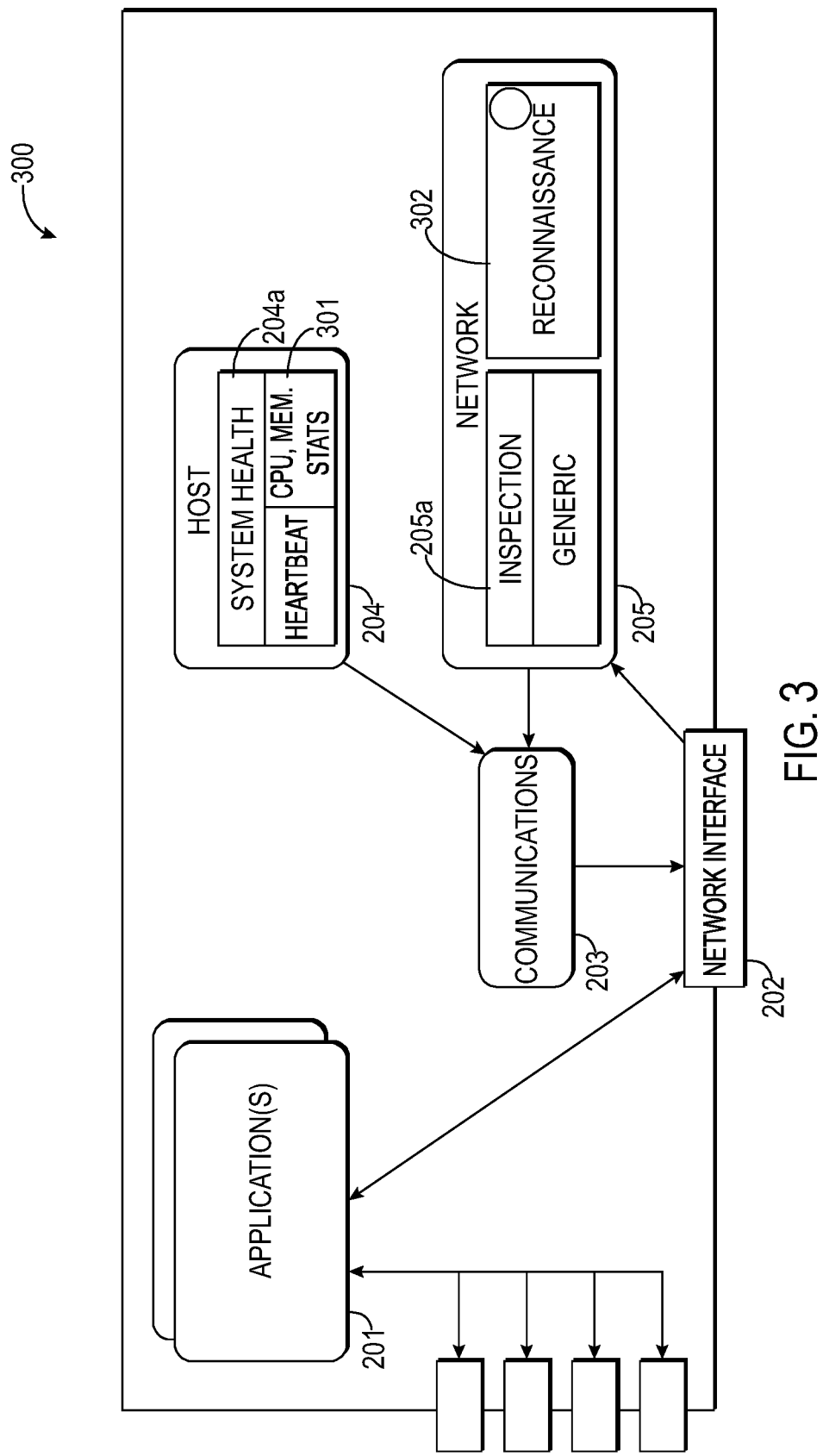
FIG. 3 illustrates an example diagram illustrating a system environment of an example IoT device, in accordance with various embodiments of the present disclosure.

Referring now to FIG. 3, an example diagram illustrating a system environment 300 of an example IoT device (e.g., 101a, 101b, and 101c) in accordance with some example embodiments described herein is provided. As shown in FIG. 3, the system environment 300 may comprise a main application 201, a network interface 202, and a communication module 203. For example, the main application 201 may be configured to couple and/or communicate with the communication module 203 through the network interface 202.

In some embodiments, the system environment 300 may further comprise an IDS sensor that runs on a network 205. In some examples, the IDS sensor may comprise an inspection engine 205a. In some examples, the inspection engine 205a may be configured to receive data through the network interface 202.

In some embodiments, the system environment 300 may further comprise a host 204, configured to communicate with the communication module 203. In some examples, the host 204 may comprise a system monitor 204a that runs on the host 204. In some examples, the system monitor 204a may be configured to monitor the system health of the example IoT device.

For example, the system monitor 204a may collect data (e.g., system health data, such as a heartbeat of the example IoT device) and transmit the collected data to the network interface 202 through the communication module 203. For example, a heartbeat of the example IoT device may indicate a status (e.g., online or offline) of the example IoT device. In some examples, the collected data may be transmitted to the IDS sensor (e.g., an inspection engine 205a). In some examples, the IDS sensor (e.g., an inspection engine 205a) may analyze and process the collected data, and generate event data upon detection of abnormality. In some examples, the event data may be transmitted to the network interface 202 through the communication module 203, and further transmitted to the server 103 through the network 102.

For example, the system monitor 204a may further collect data (e.g., system health data, such as a status of the central processing unit (CPU), a status of the memory, and/or a status of the network) and transmit the collected data to the network interface 202 through the communication module 203.

For example, the system monitor 204a may collect data (e.g., system health data, such as the status of the central processing unit (CPU), the status of the memory, and/or the status of the network) and transmit the collected data to the network interface 202 through the communication module 203. In some examples, the collected data may be transmitted to the IDS sensor (e.g., an inspection engine 205a). In some examples, the IDS sensor (e.g., an inspection engine 205a) may analyze and process the collected data, and generate event data upon detection of abnormality. In some examples, the event data may be transmitted to the network interface 202 through the communication module 203, and further transmitted to the server 103 through the network 102.

In some embodiments, the IDS sensor may further comprise a reconnaissance engine 302 that runs on the network 205. In some examples, the reconnaissance engine 302 may be configured to receive data through the network interface 202.

In some examples, the collected data may be transmitted to the IDS sensor (e.g., the reconnaissance engine 302). In some examples, the IDS sensor (e.g., the reconnaissance engine 302) may analyze and process the collected data, and generate event data upon detection of abnormality. In some examples, the event data may be transmitted to the network interface 202 through the communication module 203, and further be transmitted to the server 103 through the network 102 and collected by the server 103.

In some examples, the event data generated by the reconnaissance engine 302 may indicate third-party device discovery/status via address resolution protocol (ARP) probes, Cisco discovery protocol & router advertisements, dynamic host configuration protocol (DHCP) spoofing, or combinations of any of these.

Figure 4:
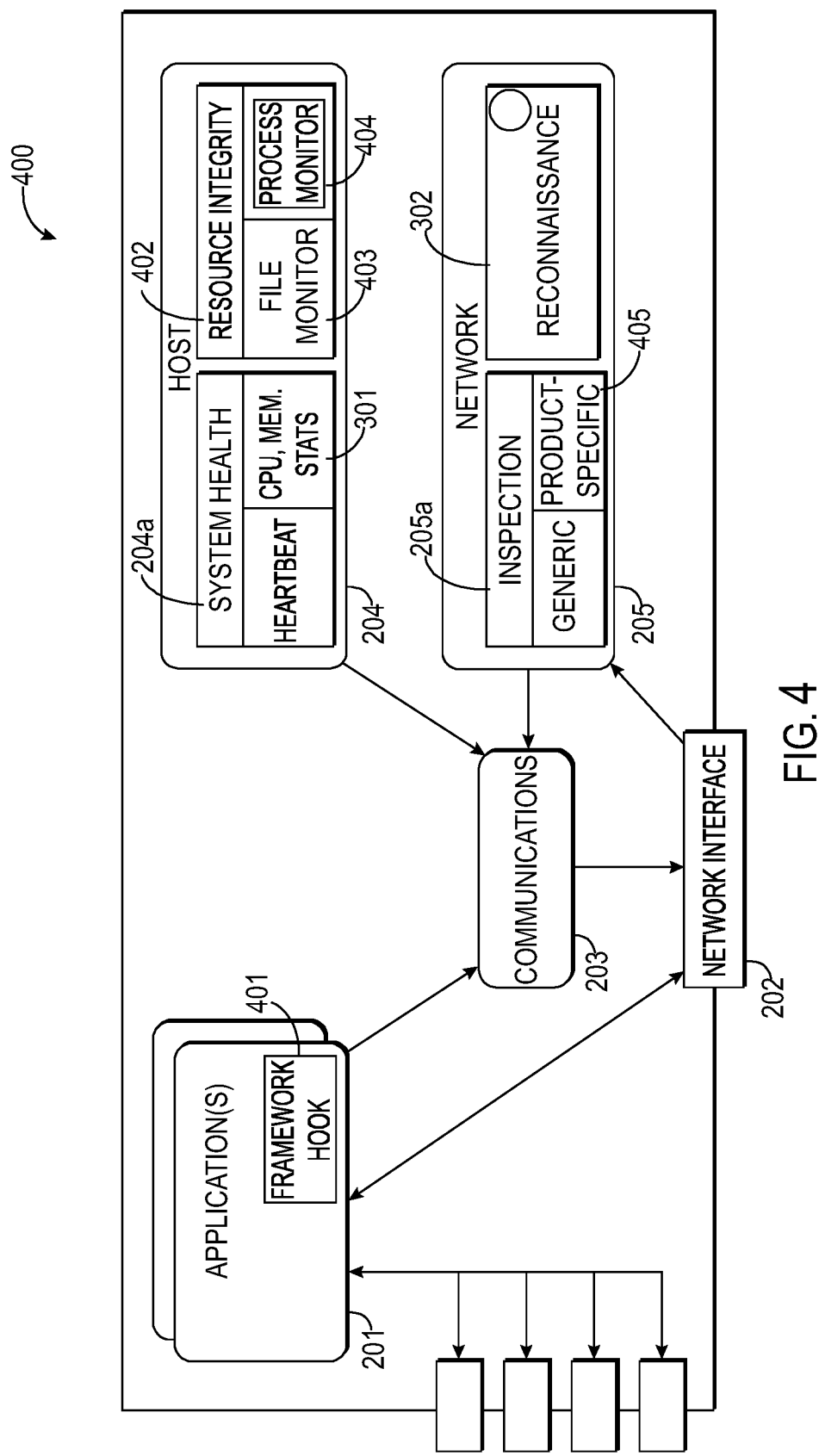
FIG. 4 illustrates an example diagram illustrating a system environment of an example IoT device, in accordance with various embodiments of the present disclosure.

Referring now to FIG. 4, an example diagram illustrating a system environment 400 of an example IoT device (e.g., 101a, 101b, and 101c) in accordance with some example embodiments described herein is provided. As shown in FIG. 4, the system environment 400 may comprise a main application 201, a network interface 202, and a communication module 203. For example, the main application 201 may be configured to couple and/or communicate with the communication module 203 through the network interface 202.

In some embodiments, the system environment 400 may further comprise an IDS sensor that runs on a network 205. In some examples, the IDS sensor may comprise an inspection engine 205a. In some examples, the inspection engine 205a may be configured to receive data through the network interface 202.

In some embodiments, the system environment 400 may further comprise a host 204, configured to communicate with the communication module 203. In some examples, the host 204 may comprise a system monitor 204a that runs on the host 204. In some examples, the system monitor 204a may be configured to monitor the system health of the example IoT device.

For example, the system monitor 204a may collect data (e.g., system health data, such as a heartbeat of the example IoT device, a status of the central processing unit (CPU), a status of the memory, and/or a status of the network) and transmit the collected data to the network interface 202 through the communication module 203. In some examples, the collected data may be transmitted to the IDS sensor (e.g., an inspection engine 205a). In some examples, the IDS sensor (e.g., the inspection engine 205a) may analyze and process the collected data, and generate event data upon detection of abnormality. In some examples, the event data may be transmitted to the network interface 202 through the communication module 203, and further transmitted to the server 103 through the network 102.

In some embodiments, the IDS sensor may further comprise a reconnaissance engine 302 that runs on the network 205. In some examples, the reconnaissance engine 302 may be configured to receive data through the network interface 202.

In some examples, the collected data may be transmitted to the IDS sensor (e.g., the reconnaissance engine 302). In some examples, the IDS sensor (e.g., the reconnaissance engine 302) may analyze and process the collected data, and generate event data upon detection of abnormality. In some examples, the event data may be transmitted to the network interface 202 through the communication module 203, and further transmitted to the server 103 through the network 102.

In some examples, the event data generated by the reconnaissance engine 302 may indicate third-party device discovery/status via address resolution protocol (ARP) probes, Cisco discovery protocol & router advertisements, dynamic host configuration protocol (DHCP) spoofing, or combinations of any of these.

In some embodiments, the host 204 may further comprise a resource integrity monitor 402 that runs on the host 204. For example, the resource integrity monitor 402 may be configured to monitor resources (e.g., files, processes, databases, and/or information systems) of the example IoT device. In some examples, the resource integrity monitor 402 may comprise a file monitor 403. For example, the file monitor 403 may monitor files of the example IoT device. In some examples, the resource integrity monitor 402 may further comprise a process monitor 404. For example, the process monitor 404 may monitor processes of the example IoT device.

In some embodiments, the system environment 400 may further comprise a framework hook 401 that is embedded on the main application 201 of the example IoT device. In some examples, the framework hook 401 may be configured to monitor security of main application 201 of the example IoT device. For example, the framework hook 401 may be configured to monitor whether the main application 201 of the example IoT device has been intruded or altered. For example, an intrusion of the main application 201 may comprise device configuration change, security-related configuration setting modification, invalid input detection, or combinations of any of these. In some examples, the framework hook 401 may be configured to monitor changes and/or modifications to other files of the example IoT device In some examples, the framework hook 401 may communicate with the resource integrity monitor 402 and the resource integrity monitor 402 may be further configured to monitor security of main application 201 of the example IoT device. In some examples, the framework hook 401 may communicate with the file monitor 403 and the file monitor 403 may be further configured to monitor security of main application 201 of the example IoT device.

In some embodiments, the inspection engine 205*a* may further comprise a product engine 405 that runs on the network 205. In some examples, the product engine 405 may be configured to receive data through the network interface 202.

For example, the resource integrity monitor 402 may collect data (e.g., resource integrity data, such as a status of the files, a status of processes, a status of databases, and/or a status of information systems) and transmit the collected data to the network interface 202 through the communication module 203. In some examples, the collected data may be transmitted to the IDS sensor (e.g., the inspection engine 205*a*). In some examples, the IDS sensor (e.g., the inspection engine 205*a*) may analyze and process the collected data, and generate event data upon detection of abnormality. In some examples, the event data may be transmitted to the network interface 202 through the communication module 203, and further transmitted to the server 103 through the network 102.

Figure 5:
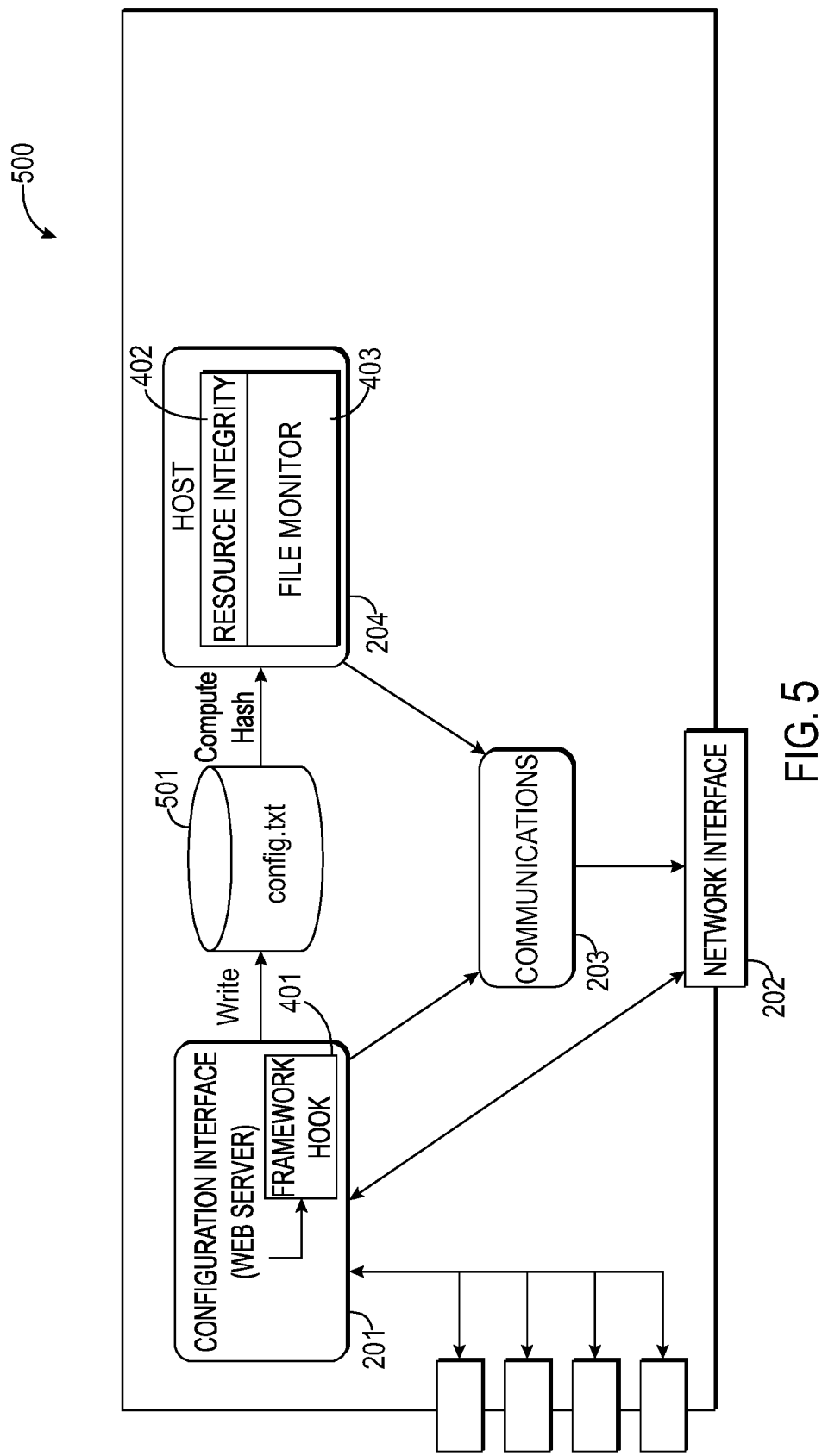
FIG. 5 illustrates an example diagram illustrating a system environment of an example IoT device, in accordance with various embodiments of the present disclosure.

Referring now to FIG. 5, an example diagram illustrating a system environment 500 of an example IoT device (e.g., 101*a*, 101*b*, and 101*c*) in accordance with some example embodiments described herein is provided. As shown in FIG. 5, the system environment 500 may comprise a main application 201, a network interface 202, and a communication module 203. For example, the main application 201 may be configured to couple and/or communicate with the communication module 203 through the network interface 202.

In some embodiments, the system environment 500 may further comprise a host 204, configured to communicate with the communication module 203.

In some embodiments, the host 204 may comprise a resource integrity monitor 402 that runs on the host 204. For example, the resource integrity monitor 402 may be configured to monitor resources (e.g., files, processes, databases, and/or information systems) of the example IoT device. In some examples, the resource integrity monitor 402 may comprise a file monitor 403. For example, the file monitor 403 may monitor files of the example IoT device.

In some embodiments, the system environment 500 may further comprise a framework hook 401 that is embedded on the main application 201 of the example IoT device. For example, the framework hook 401 may be configured to monitor security of main application 201 of the example IoT device. For example, the framework hook 401 may be configured to monitor whether the main application 201 of the example IoT device has been intruded or altered.

In some examples, the framework hook 401 may communicate with the resource integrity monitor 402 and the resource integrity monitor 402 may be further configured to monitor security of main application 201 of the example IoT device. In some examples, the framework hook 401 may communicate with the file monitor 403 and the file monitor 403 may be further configured to monitor security of main application 201 of the example IoT device.

For example, the resource integrity monitor 402 may collect data (e.g., resource integrity data, such as a status of the files, a status of the main application 201) and transmit the collected data to the network interface 202 through the communication module 203. In some examples, the collected data may be transmitted to an IDS sensor. In some examples, the IDS sensor may analyze and process the collected data, and generate event data upon detection of abnormality. In some examples, the event data may be transmitted to the network interface 202 through the communication module 203, and further transmitted to the server 103 through the network 102.

In some embodiments, as shown in FIG. 5, the main application 201 may have a configuration interface and/or a web server. For example, a configuration file 501 may be created in the system environment 500 in an instance in which the main application 201 is intruded and/or altered. In some examples, a hash value of the configuration file 501 may be computed. In some examples, the resource integrity monitor 402 (e.g., the file monitor 403) may receive the hash value. In additional examples, the received hash value may be compared to an original hash value to determine whether the main application 201 is intruded and/or altered.

Figure 6:
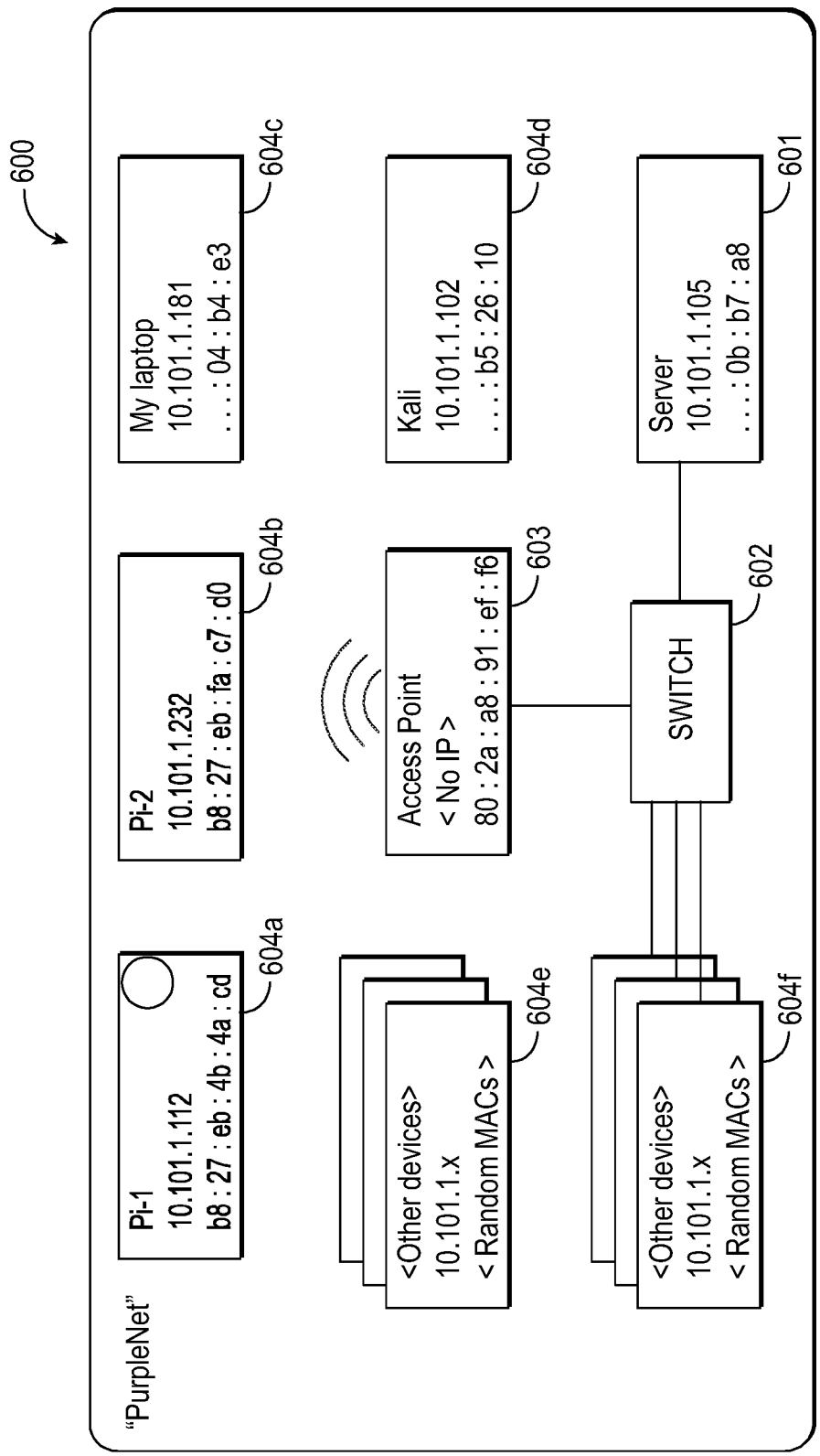
FIG. 6 illustrates an example diagram illustrating a layout of an example network, in accordance with various embodiments of the present disclosure.

Referring now to FIG. 6, an example diagram illustrating an example layout of the network in accordance with some example embodiments described herein is provided. As shown in FIG. 6, the example layout 600 may comprise a server 601, a switch 602, an access point 603, and IoT devices (e.g., a first Raspberry Pi 604*a*, a second Raspberry Pi 604*b*, a computer 604*c*, a Kali device 604*d*, other wireless devices 604*e*, and other wired devices 604*f*). In some examples, the network described herein may correspond to the network 102 as described in FIG. 1.

In some embodiments, the IoT devices (e.g., the first Raspberry Pi 604*a*, and the second Raspberry Pi 604*b*) may be devices that run on an operating system (OS) of Raspbian. For example, the Raspbian OS may be based on Debian Linux. In some examples the IoT devices may include a Raspberry Pi Zero.

In some embodiments, the server 601 and the access point 603 are connected and/or coupled to the switch 602.

In some examples, IoT devices (e.g., the first Raspberry Pi 604*a*, the second Raspberry Pi 604*b*, the computer 604*c*, and the Kali device 604*d*) may be connected wirelessly to the switch 602 through the access point 603. In some examples, IoT devices (e.g., the other wired devices 604*f*) may be connected to the switch 602 through wires.

For example, the server 103 may be configured to couple and/or communicate with the IoT devices (e.g., 101*a*, 101*b*, and 101*c*) through the network interface 202.

Figure 7:
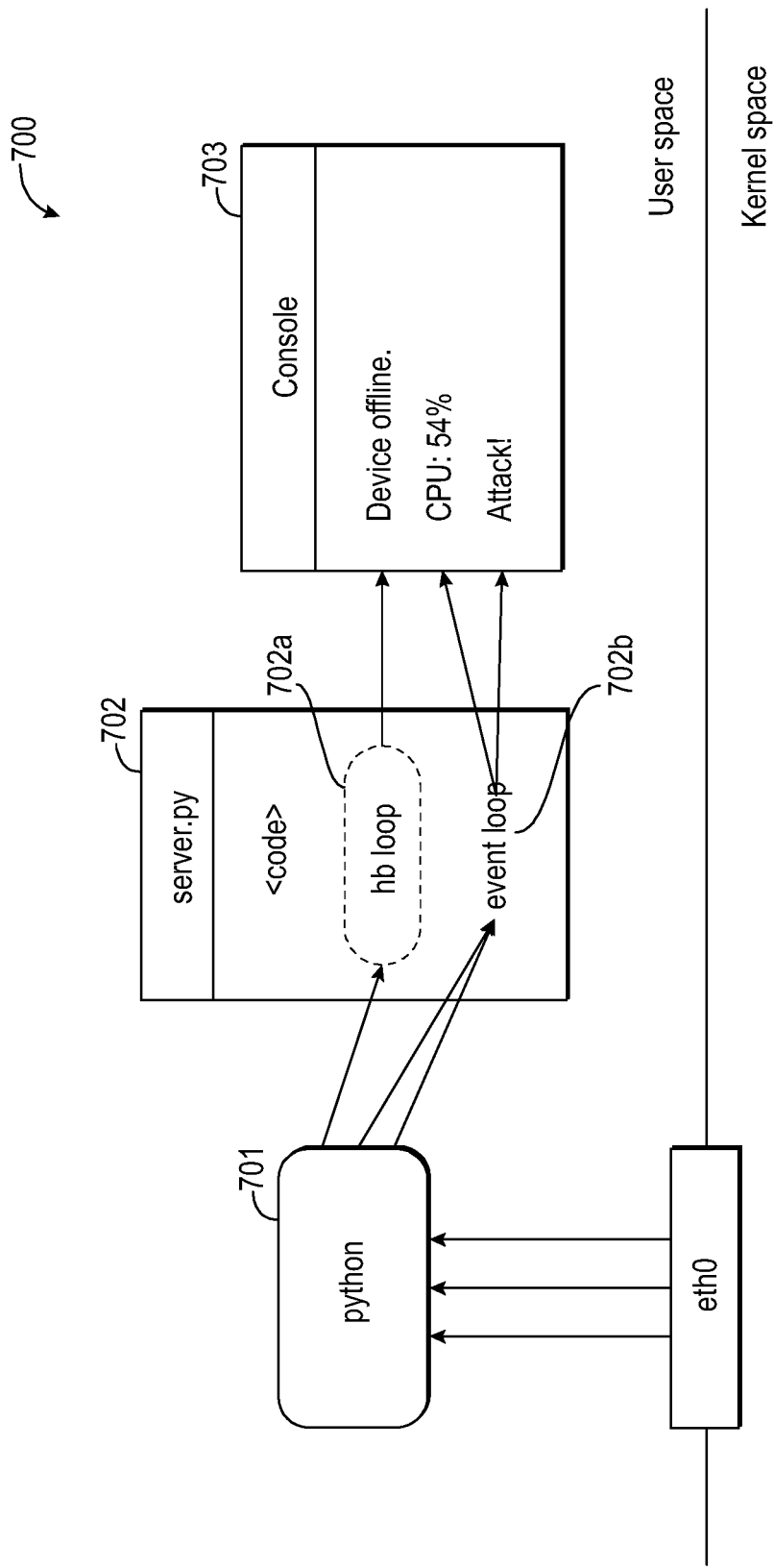
FIG. 7 illustrates an example diagram illustrating a layout of an example server, in accordance with various embodiments of the present disclosure.

Referring now to FIG. 7, an example diagram illustrating a layout of an example server 700 in accordance with some example embodiments described herein is provided. As shown in FIG. 7, the example server 700 may comprise a python platform 701, a server application 702, and a console 703. For example, the server application 702 and the console 703 may be running on the python platform 701. In some examples, the example server 700 described herein may correspond to the server 103 as described in FIG. 1.

For example, the example server 700 may correlate and analyze the collected event data from the IoT devices. In some examples, the example server 700 may be an event sink only server. For example, the event sink only server may be configured to receive and analyze the collected event data from the IoT devices. In some examples, unusual network activity detected at multiple locations may be used as an attack indicator.

In some embodiments, the IoT devices may send in the collected event data to the example server 700 and the example server 700 may have at least a heartbeat loop and an event loop that are running to update the console 703.

In some examples, the console 703 may display that an IoT device is online or offline. In some examples, the console 703 may display how much resources are used by an IoT device. In some examples, the console 703 may display that an IoT device is attacked by intrusion.

In some embodiments, the example server 700 may be configured to generate an alert according to the analyzing of the event data.

In some embodiments, generating the alert may comprise blocking the devices associated with the event data from accessing a service, transmitting instructions to the devices associated with the event data to reinstall the main application on devices associated with the event data, transmitting a message to an administrator, or combinations of these.

Figure 8:
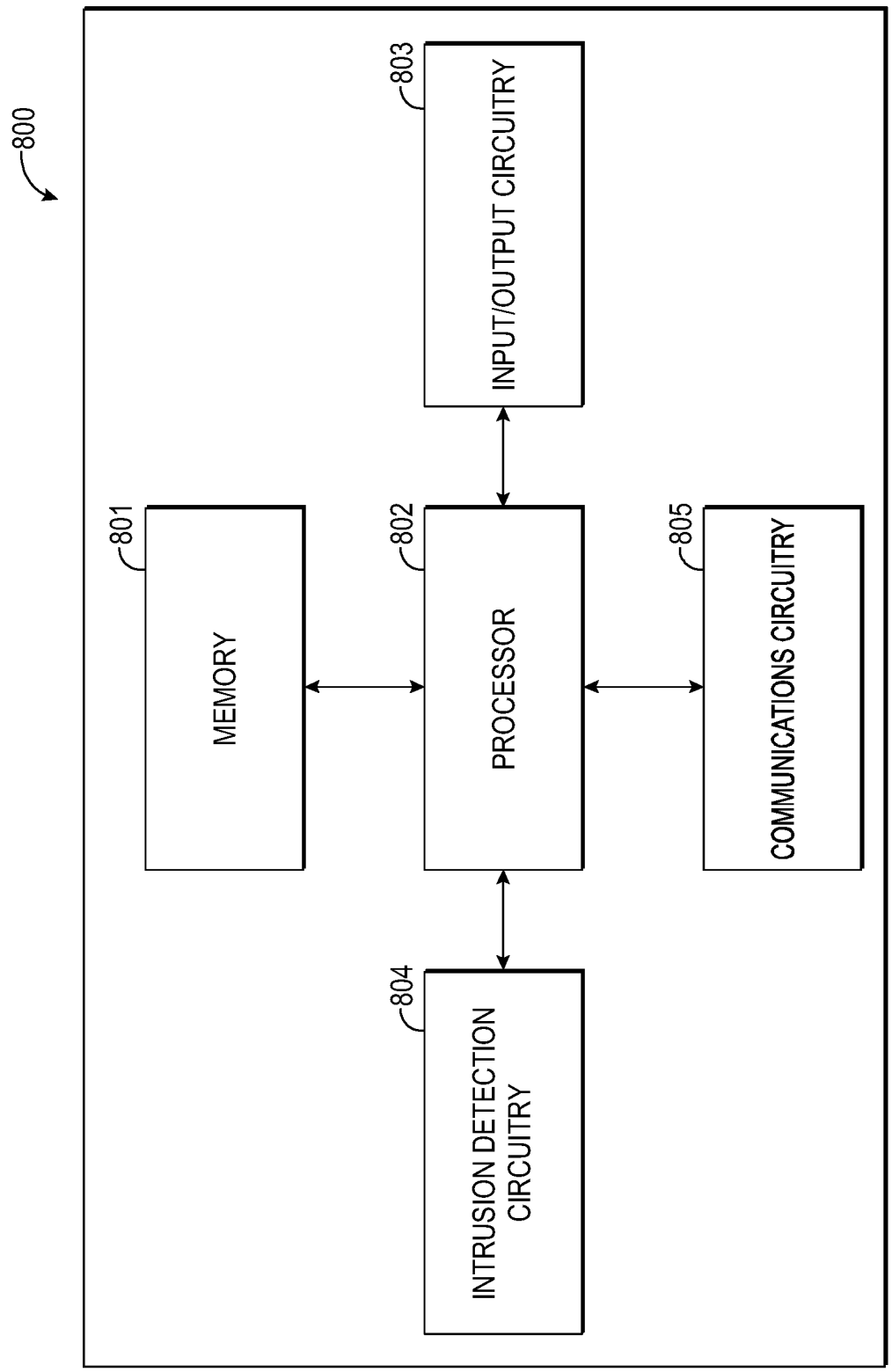
FIG. 8 illustrates an example block diagram illustrating an example server, in accordance with various embodiments of the present disclosure.

Referring now to FIG. 8, an example block diagram illustrating an example server in accordance with some example embodiments described herein is provided. The example server 800 may comprise one or more components as shown in FIG. 8. In some examples, the example server 800 described herein may correspond to the server 103 as described in FIG. 1. The example server 800 may comprise a processor 802, a memory 801, input/output circuitry 803, communications circuitry 805, and optionally an intrusion detection circuitry 804. The example server 800 may be configured to execute the operations described herein. Although these components 801-806 are described with respect to functional limitations, it should be understood that the particular implementations necessarily include the use of particular hardware. It should also be understood that certain of these components 801-806 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the example server 800 may provide or supplement the functionality of particular circuitry. For example, the processor 802 may provide processing functionality, the memory 801 may provide storage functionality, the communications circuitry 805 may provide network interface functionality, and the like.

In some embodiments, the processor 802 (and/or co-processor or any other processing circuitry assisting or otherwise associated with the processor) may be in communication with the memory 801 via a bus for passing information among components of the apparatus. The memory 801 may be non-transitory and may include, for example, one or more volatile and/or non-volatile memories. In other words, for example, the memory may be an electronic storage device (e.g., a computer readable storage medium). The memory 801 may be configured to store information, data, content, applications, instructions, identifiers, requests, communications, or the like, for enabling the apparatus to carry out various functions in accordance with example embodiments of the present disclosure.

The memory 801 may include a non-volatile computer-readable storage medium such as a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

The processor 802 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 802 may be configured to execute instructions stored in the memory 801 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the example server 800 may include input/output circuitry 803 that may, in turn, be in communication with processor 802 to provide output to a user and, in some embodiments, to receive an indication of a user input. The input/output circuitry 803 may comprise a user interface and may include a display and may comprise a web user interface, a mobile application, a kiosk, or the like. In some embodiments, the input/output circuitry 803 may also include a keyboard, a mouse, a joystick, a touch screen, touch areas, soft keys, a microphone, a speaker, and/or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 801, and/or the like).

The intrusion detection circuitry 804 includes hardware configured to correlate and analyze the collected event data. The intrusion detection circuitry 804 may utilize processing circuitry, such as the processor 802, to perform these actions. The intrusion detection circuitry 804 may send and/or receive data from an intrusion database. In some embodiments, the sent and/or received data may be file hashes, historical threat indicators, predictive indicators, and/or the like. It should also be appreciated that, in some embodiments, the intrusion detection circuitry 804 may include a separate processor, specially configured field programmable gate array (FPGA), or application specific interface circuit (ASIC).

The communications circuitry 805 may be any means such as a device or circuitry embodied in either hardware or a combination of hardware and software that is configured to receive and/or transmit data from/to a network and/or any other device, circuitry, or module in communication with the example server 800. In this regard, the communications circuitry 805 may include, for example, a network interface for enabling communications with a wired or wireless communication network. For example, the communications circuitry 805 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 9:
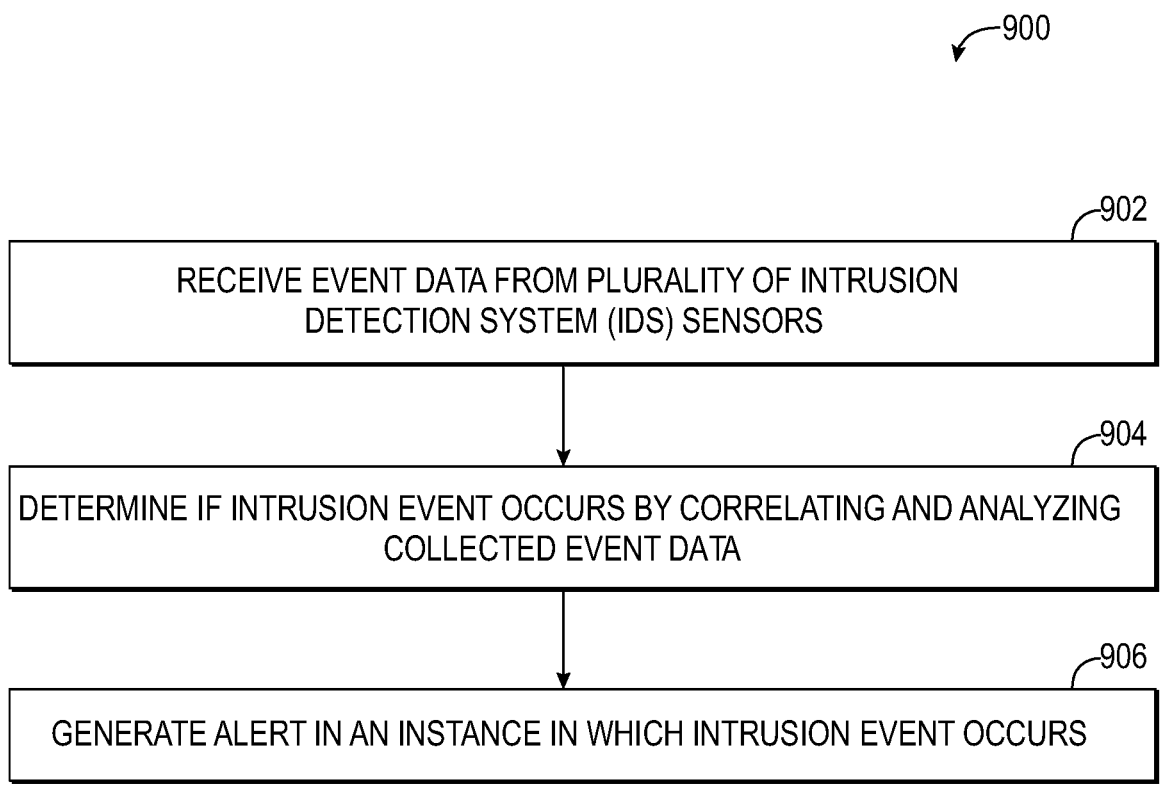
FIG. 9 illustrates an exemplary flow diagram illustrating an n exemplary method for distributed intrusion detection by a server, in accordance with various embodiments of the present disclosure.

Referring now to FIG. 9, an exemplary flow diagram illustrating an exemplary method for distributed intrusion detection by a server in accordance with some exemplary embodiments of the present disclosure are provided. It is noted that each block of a flowchart, and combinations of blocks in the flowchart, may be implemented by various means such as hardware, firmware, circuitry and/or other devices associated with execution of software including one or more computer program instructions. For example, one or more of the steps/operations described in FIG. 9 may be embodied by computer program instructions, which may be stored by a non-transitory memory of an apparatus employing an embodiment of the present disclosure and executed by a processor component in an apparatus (such as, but not limited to, a controller component, a programable processor, a mobile device, a remote computing server, and/or the like). For example, these computer program instructions may direct the processor component to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may include various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As shown in FIG. 9, an exemplary method 900 for distributed intrusion detection by a server in accordance with some exemplary embodiments described herein is illustrated. The exemplary method 900 may be executed by a computing device (for example, the server 103 as illustrated and described above in connection with at least FIG. 1) including a processor and a memory (for example, the processor 802 and the memory 801 as illustrated and described above in connection with at least FIG. 8).

At step/operation 902, the server 103 may receive event data from a plurality of intrusion detection system (IDS) sensors.

In some embodiments, the plurality of IDS sensors may be distributed in internet of things (IoT) devices and be configured to collect the event data from the internet of things (IoT) devices. In some examples, the server 103 is coupled to the plurality of IDS sensors through a network 102.

At step/operation 904, the server 103 may determine if an intrusion event occurs by correlating and analyzing the collected event data.

In some examples, as shown in FIG. 2, the plurality of IDS sensors may comprise at least one inspection engine 205a embedded in corresponding IoT devices. For example, the at least one inspection engine 205a may be configured to monitor system health status of the corresponding IoT devices.

In some examples, as shown in FIG. 4, the plurality of IDS sensors comprise at least one frame hook 401 embedded in main application 201 of corresponding IoT devices. For example, the at least one inspection engine 205a may be configured to communicate with the at least one frame hook 401 and monitor if the intrusion event occurs to the main application of the corresponding IoT devices.

In some examples, as shown in FIG. 3, the plurality of IDS sensors may comprise at least one reconnaissance engine 302. For example, the at least one reconnaissance engine 302 may be configured to monitor if the intrusion event occurs to the network.

In some embodiments, the server 103 may comprise an intrusion database and the intrusion database is configured to store at least one or more historically intrusion data representing one or more malicious content items. For example, correlating and analyzing the collected event data may comprise comparing the collected event data to data the at least one or more historically intrusion data stored in the intrusion database and identifying the intrusion event. In some examples, comparing the collected event data to the at least one or more historically intrusion data stored in the intrusion database may comprise comparing a hash value of the collected event data with a hash value of the at least one or more historically intrusion data stored in the intrusion database.

At step/operation 906, the server 103 may generate an alert in an instance in which the intrusion event occurs.

In some embodiments, the alert may be sent to IoT devices that are associated with the collected event data.

In some examples, generating the alert may comprise blocking the IoT devices associated with the event data from accessing a service, transmitting instructions to the IoT devices associated with the event data to reinstall the main application 201 on IoT devices associated with the event data, transmitting a message to an administrator, or combinations of these.

As described above and as will be appreciated based on this disclosure, embodiments of the present disclosure may include various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. A distributed intrusion detection system (IDS), comprising:
   a plurality of IDS sensors distributed in internet of things (IoT) devices; and
   a server coupled to the plurality of IDS sensors through a network and comprising an intrusion database storing historically intrusion data representing one or more malicious content items, wherein the plurality of IDS sensors are configured to collect event data from the IoT devices, and the server is configured to:
   receive collected event data from the plurality of IDS sensors;
   determine if an intrusion event occurs by correlating and analyzing the collected event data, wherein correlating and analyzing the collected event data comprises comparing a hash value of the collected event data to a hash value of the historically intrusion data; and
   generate an alert in an instance in which the intrusion event occurs.

2. The distributed IDS according to claim 1, wherein:
   the plurality of IDS sensors comprise at least one inspection engine embedded in corresponding IoT devices, wherein the at least one inspection engine is configured to monitor system health status of the corresponding IoT devices.

3. The distributed IDS according to claim 2, wherein:
   the plurality of IDS sensors comprise at least one frame hook embedded in applications of corresponding IoT devices, wherein the at least one inspection engine is configured to communicate with the at least one frame hook and monitor if the intrusion event occurs to the applications of the corresponding IoT devices.

4. The distributed IDS according to claim 1, wherein:
   the plurality of IDS sensors comprise at least one reconnaissance engine, wherein the at least one reconnaissance engine is configured to monitor if the intrusion event occurs to the network.

5. The distributed IDS according to claim 1, wherein the server is further configured to:
   send the alert to IoT devices that are associated with the collected event data.

6. The distributed IDS according to claim 1, wherein the server is located on premises of the IoT devices or in a cloud.

7. The distributed IDS according to claim 1, wherein the plurality of IDS sensors use Tshark for network protocol analysis.

8. A method for distributed intrusion detection by a server, comprising:
   receiving event data from a plurality of intrusion detection system (IDS) sensors, wherein the plurality of IDS sensors are distributed in internet of things (IoT) devices and are configured to collect the event data from IoT devices, and the server is coupled to the plurality of IDS sensors through a network and comprises an intrusion database storing historically intrusion data representing one or more malicious content items;
   determining if an intrusion event occurs by correlating and analyzing the collected event data comprising comparing a hash value of the collected event data to a hash value of the historically intrusion data; and
   generating an alert in an instance in which the intrusion event occurs.

9. The method for distributed intrusion detection according to claim 8, wherein:
   the plurality of IDS sensors comprise at least one inspection engine embedded in corresponding IoT devices, wherein the at least one inspection engine is configured to monitor system health status of the corresponding IoT devices.

10. The method for distributed intrusion detection according to claim 9, wherein:
    the plurality of IDS sensors comprise at least one frame hook embedded in applications of corresponding IoT devices, wherein the at least one inspection engine is configured to communicate with the at least one frame hook and monitor if the intrusion event occurs to the applications of the corresponding IoT devices.

11. The method for distributed intrusion detection according to claim 8, wherein:
    the plurality of IDS sensors comprise at least one reconnaissance engine, wherein the at least one reconnaissance engine is configured to monitor if the intrusion event occurs to the network.

12. The method for distributed intrusion detection according to claim 8, wherein the server is further configured to:
    send the alert to IoT devices that are associated with the collected event data.

13. The method for distributed intrusion detection according to claim 8, wherein the server is located on premises of the IoT devices or in a cloud.

14. The method for distributed intrusion detection according to claim 8, wherein the plurality of IDS sensors use Tshark for network protocol analysis.

\* \* \* \* \*